United States Patent
Skrainar et al.

(10) Patent No.: US 10,073,664 B2
(45) Date of Patent: Sep. 11, 2018

(54) SYSTEM AND METHOD FOR CONVEYING PRINT DEVICE STATUS INFORMATION USING A LIGHT INDICATOR FEEDBACK MECHANISM

(71) Applicant: Xerox Corporation, Norwalk, CT (US)

(72) Inventors: Stephen F. Skrainar, Penfield, NY (US); Andrew T. Martin, Honeoye Falls, NY (US); Donald A. Brown, Honeoye Falls, NY (US); Keith L. Willis, Rochester, NY (US); Ken Hayward, Brockport, NY (US); Brandon S. McComber, Webster, NY (US); Shinichi Maekawa, Ebina (JP); Mitsuharu Ito, Yokohama (JP); Shinya Kogoh, Fujisawa (JP); Masaaki Takenouchi, Yokohama (JP)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/186,657

(22) Filed: Jun. 20, 2016

(65) Prior Publication Data

US 2017/0364319 A1 Dec. 21, 2017

(51) Int. Cl.
*G06F 3/12* (2006.01)
*H04N 1/00* (2006.01)

(52) U.S. Cl.
CPC .......... *G06F 3/1259* (2013.01); *G06F 3/1203* (2013.01); *G06F 3/1294* (2013.01)

(58) Field of Classification Search
None
See application file for complete search history.

(56) References Cited

U.S. PATENT DOCUMENTS

| | | | |
|---|---|---|---|
| 5,847,693 A | 12/1998 | Shima | |
| 6,658,218 B2 | 12/2003 | Krolczyk et al. | |
| 7,782,224 B2 | 8/2010 | Marchetti | |
| 8,334,992 B2 | 12/2012 | Kitamura | |
| 2003/0011792 A1* | 1/2003 | Noyes | B41J 2/2135 358/1.4 |
| 2004/0239615 A1 | 12/2004 | Firebaugh et al. | |
| 2008/0308398 A1 | 12/2008 | Ito | |
| 2009/0002730 A1 | 1/2009 | Yamada et al. | |
| 2010/0091321 A1* | 4/2010 | LeVier | H04N 1/00143 358/1.15 |

(Continued)

*Primary Examiner* — Helen Zong
(74) *Attorney, Agent, or Firm* — Fox Rothschild LLP

(57) ABSTRACT

A system for providing print device dynamic status indicator feedback includes a print device, and a status indicator feedback unit. The print device includes a print engine and one or more status monitors. The status indicator feedback unit includes a display device, a light emitting module, a processor in communication with the light emitting module, and a computer-readable medium containing programming instructions. The system may receive information corresponding to one or more current machine states of the print device from the one or more status monitors of the print device, determine a priority level associated with each of the one or more current machine states, identify a machine state associated with a highest priority level, identify a dynamic feedback pattern associated with the identified machine state. The dynamic feedback pattern includes a visual pattern. The system may and instruct the light emitting module to emit the visual pattern.

31 Claims, 7 Drawing Sheets

(56) References Cited

U.S. PATENT DOCUMENTS

| | | |
|---|---|---|
| 2012/0250070 A1 | 10/2012 | Sakamoto |
| 2013/0027737 A1 | 1/2013 | Suzuki |
| 2013/0053129 A1 | 2/2013 | LeMay et al. |
| 2014/0253953 A1* | 9/2014 | Oakley .................... G06F 11/30 358/1.15 |
| 2014/0327927 A1* | 11/2014 | Lamontagne .............. B41J 3/36 358/1.14 |
| 2016/0004496 A1* | 1/2016 | Liebelt .................. G06F 3/1273 358/1.15 |
| 2016/0037012 A1* | 2/2016 | Okado ................. H04N 1/1013 358/474 |
| 2017/0140482 A1* | 5/2017 | Salter ..................... G06Q 50/06 |

\* cited by examiner

SYSTEM AND METHOD FOR CONVEYING PRINT DEVICE STATUS INFORMATION USING A LIGHT INDICATOR FEEDBACK MECHANISM

BACKGROUND

In the competitive consumer market for multifunction devices (MFDs) and other types of printing devices, it is of particular importance that a device be user-friendly. The ability of a device to provide customizable features and functions can drastically affect customer satisfaction. One aspect of a "user-friendly" print device is its effectiveness in communicating status and configuration information to the user.

Commercially available printing devices typically include one or more monochromatic indicator lights configured to visually indicate to the user the current status or machine state of the printing device. Printing devices may further include indicator lights (such as light emitting diodes) that are multi-color to enhance the indication function of the indicator light. Typically, indicator lights include three possible states, namely, "off" (e.g., to indicate the printing device is operating properly), "steady" (e.g., indicating that operator intervention is required), and "blinking" (e.g., indicating that immediate or urgent operator intervention is required). However, the conventional indicator lights only convey binary information such as power is on or off, there is a print job pending or not, or the like.

This document describes devices and methods that are intended to address issues discussed above and/or other issues.

SUMMARY

In an embodiment, a system for providing print device dynamic status indicator feedback to a user may include a print device and a status indicator feedback unit. The print device may include a print engine and one or more status monitors. The status indicator feedback unit may include a display device, a light emitting module proximate to the display device, a processor in communication with the light emitting module, and a computer-readable medium containing programming instructions. The system may receive information corresponding to one or more current machine states of the print device from the one or more status monitors of the print device, determine a priority level associated with each of the one or more current machine states, identify a machine state associated with a highest priority level, and identify a dynamic feedback pattern associated with the identified machine state. The dynamic feedback pattern may include a visual pattern for providing a dynamic status indicator feedback. The system may then instruct the light emitting module to emit the visual pattern.

In an embodiment, the light emitting module may include a light emitting display comprising an LED, and a control unit. The control unit may be configured to receive the dynamic feedback pattern associated with the identified machine state from the processor, and generate commands to cause the LED to emit the visual pattern and provide the dynamic status indicator feedback.

In some embodiments, a characteristic of the visual pattern dynamically changes to convey real-time information about a status of the identified machine state. The characteristic may be selected from one or more of the following: a size of the visual pattern, a shape of the visual pattern, an intensity of the visual pattern, or a brightness of the visual pattern.

In at least one embodiment, the system may also include an audio module. The system may identify the dynamic feedback pattern so that the dynamic feedback pattern also includes at least one audio pattern, and instruct the audio module to output the audio pattern as the light emitting module emits the visual pattern. The audio module may output the audio pattern such that the audio pattern simulates the visual pattern.

In an embodiment, the system may receive the information corresponding to the one or more current machine states from the print device continuously, at fixed time intervals, in response to a change in a machine state of the print device, or in response to a request sent from the status indicator feedback unit to the print device.

In certain embodiments, the system may determine the priority level associated with each of the one or more current machine states by identifying a category associated with each of the one or more current machine states, and then assigning the priority level based on the identified category. The category is selected from a shutdown error state, a needs attention state, and operational state, and a steady state. A machine state in the shutdown error state category is assigned a highest priority level, a machine state in the needs attention state category is assigned an intermediate priority level, a machine state in the operational state category is assigned a low priority level, and a machine state in the steady state category is assigned a lowest priority level. In an embodiment, the dynamic feedback pattern may include one or more distinct visual patterns corresponding to a machine state in the shutdown error state category, a machine state in the needs attention state category, a machine state in the operational state category, or a machine state in the steady state category.

The system may identify the machine state associated with the highest priority level based on the assigned priority level. Alternatively and/or additionally, the system may identify the machine state associated with the highest priority level based on a status of the one or more current machine states. The status of a machine state may include information about the machine state.

In an embodiment, the visual pattern may include patterns formed using one or more LED colors, one or more LED intensity variations, one or more LED illumination patterns, one or more LED illumination shapes, or one or more LED illumination sizes. For example, the visual pattern may include one or more of the following: a low-rate breathing illumination pattern, a high-rate breathing illumination pattern, a blinking illumination pattern, a solid illumination pattern, a growing bar shape illumination pattern, or a growing ring shape illumination pattern. In an example embodiment, the identified machine state is in the shutdown error state category, and the visual pattern includes a high-rate breathing illumination pattern in a red color. In another embodiment, the identified machine state is in the needs attention state category, and the visual pattern includes a low-rate breathing illumination pattern. The rate of breathing of the low rate breathing-pattern may increase or decrease to indicate a status of the identified machine state. In yet another embodiment, the identified machine state is in the operational state category, and the visual pattern includes a growing bar shape illumination pattern. The size of the growing bar shape illumination pattern may increase or decrease to indicate a status of the identified machine state, such that the status provides information relating to a time to completion associated with the identified machine state in the operational state category.

The display device of the system may be configured to provide information about the dynamic status indicator feedback using text, graphics, or pictures.

In another aspect, a multifunction device may include a print engine, and a status indicator feedback unit. The status indicator feedback unit may include a light emitting module, a processor in communication with the light emitting module, and a computer-readable medium containing programming instructions. The multifunction device may receive information corresponding to one or more current machine states of the multifunction device from one or more status monitors, determine a priority level associated with each of the one or more current machine states, identify a machine state associated with a highest priority level, and identify a dynamic feedback pattern associated with the identified machine state. The dynamic feedback pattern may include a visual pattern for providing a dynamic status indicator feedback. A characteristic of the visual pattern dynamically changes to convey real-time information about a status of the identified machine state. The multifunction device may instruct the light emitting module to emit the visual pattern.

DETAILED DESCRIPTION

Figure 1A:
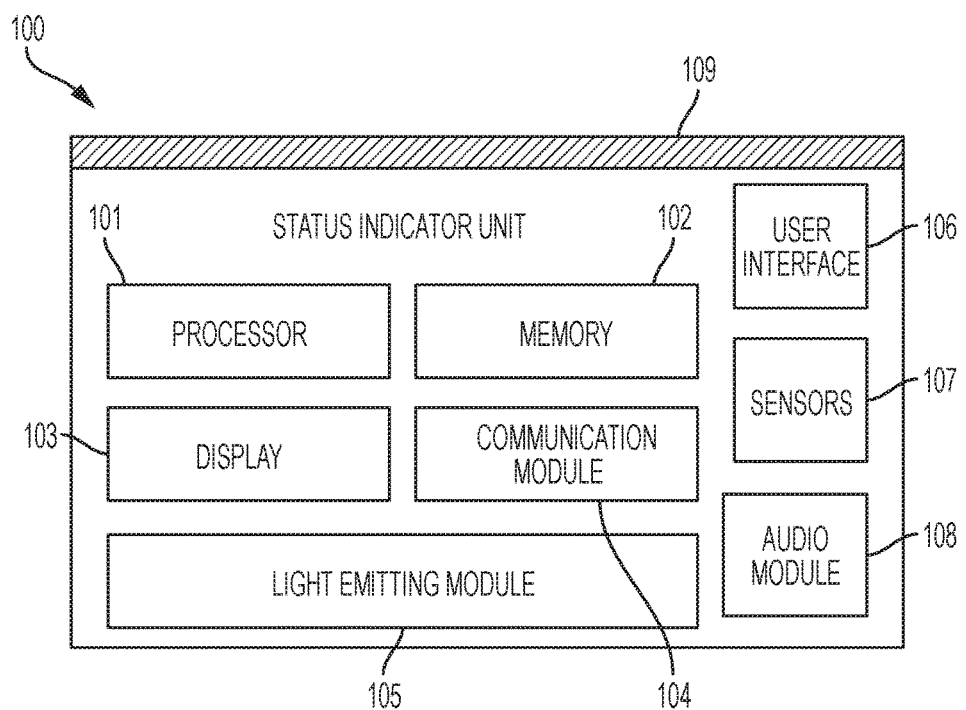
FIG. 1A illustrates an example block diagram of a status indicator feedback unit, according to one embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

A "print device" refers to a device that includes a print engine for printing documents. The print device may also include a processor that can process the documents and a non-transitory memory device for storage of programming instructions, documents or portions of documents. Any suitable print device can be used including, but not limited to, inkjet and laser print devices, copiers, print devices, and the like. The print device may further include one or more sensors and/or monitors that collect information relating to a machine state of the print device. Examples of such sensors and/or monitors may include, without limitation, actuators, end switches, toner sensors, paper tray sensors, paper jam sensors, shaft rotation sensors, position sensors, ink sensors, acceleration and/or velocity sensors, tension sensors, torsion sensors, heating/cooling sensors, voltage sensors, current sensors, connectivity detectors, light sensors, time sensors, print setting sensors, or any other similar device that may collect data from individual components of a print drive, and send signals or input about the individual components to a processing device.

The term "multi-function device" (or "MFD") refers to a print device comprising hardware and associated software configured for enabling the device to print documents on substrates, as well as perform at least one other function on a document such as copying, facsimile transmitting or receiving, image scanning, emailing, or performing other actions on document-based data.

The terms "computer-readable medium," "data storage facility," and "memory" each refer to a non-transitory device on which computer-readable data, programming instructions or both are stored. Unless the context specifically states that a single device is required or that multiple devices are required, the terms "computer-readable medium," "data storage facility," and "memory" include both the singular and plural embodiments, as well as portions of such devices such as memory sectors.

An "electronic device" refers to a device or system of devices that include a processor and a computer-readable medium. The memory may contain programming instructions in the form of a software application that, when executed by the processor, causes the device to perform one or more processing operations according to the programming instructions. An electronic device also may include additional components such as a touch-sensitive display device, microphone, keyboard or keypad or other components that serve as a user interface, as well as a camera or other imaging device. An electronic device also may include one or more communication hardware components such as a transmitter and/or receiver that will enable the device to send and/or receive signals to and/or from other devices, whether via a communications network or via near-field or short-range communication protocols. Examples of electronic devices include smartphones, digital cameras, tablet computing devices, aerial drones, personal computers, wearable electronic devices, and the like.

In this document, the terms "processor" and "processing device" refer to a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

The term "machine state" of a print device refers to its state of operation at a given point of time. Examples of machine state may include, without limitation, SHUTDOWN ERROR STATE (e.g., system unable to print or process a current job due to fault condition), NEEDS ATTENTION STATE (e.g., attention needed soon to continue uninterrupted production), INFORMATIONAL (e.g., informational message exists), OPERATIONAL (e.g., system is printing a job, system is powering on, system is downloading data, battery life, or the like), STEADY STATE (e.g., print device turned off, no active print jobs in system or idle, or print device is powered "on" and ready for printing), or the like.

A machine state may have a "status" associated with it that may provide additional information about the machine state such as the percentage of completion (and/or remaining) of a function like printing, time associated with a fault, or the like. Other machine states and statuses are within the scope of this disclosure.

A "dynamic status indicator feedback" is a visual or an audio-visual signal that provides various real-time information relating to a machine state of a print device, and which includes a dynamic visual pattern. One or more characteristics (such as size, shape, intensity, brightness, rate of breathing, or the like) of the dynamic visual pattern change in real-time to also provide information about a real-time status of the machine state. A visual dynamic status indicator feedback may convey information using dynamic visual patterns presented through use of one or more lighting devices such as LEDs. Examples may include, without limitation, a change in brightness of one or more lighting devices, one or more LEDs illuminated in a sequence or pattern (solid, blinking, blinking with different patterns and/or rates, direction of illumination, geometrical patterns, etc.), one or more LEDs illuminated in one or more colors (amber, blue, green, red, etc.), intensities, or the like. An audio module may produce sound to create an audio signal. For example, a speaker may be used to provide a beeping tone or other audible output that conveys status indicator feedback. Audible and visible signals may be combined (e.g., by providing a tone in conjunction with a flashing light output). A status indicator feedback may be implemented via a visual display on an associated display device.

In this document, the terms "breathing" and "breathing pattern," of a lighting device, refers to a visual pattern that includes changing the intensity of the lighting device from dim to bright and/or from bright to dim such that it mimics a breathing rhythm. A "rate of breathing" or "frequency of breathing" refers to the rate of change of intensity from dim to bright and/or from bright to dim.

FIG. 1A is a block diagram that illustrates various elements of status indicator feedback unit 100 that may be used to convey device status information using light indicator feedback mechanism as discussed below with respect to FIG. 3. In an embodiment, the status indicator feedback unit 100 is an electronic device that may include a processor 101 that is in electronic communication with the other elements of the status indicator feedback unit. The status indicator feedback unit may include programming instructions that when executed cause the processor 101 to convey the machine state, and its corresponding status, of a print device attached to the status indicator feedback unit, as discussed below, in conjunction with the light emitting module 105. The status indicator feedback unit 100 may also include a communication module 104 that is capable of transmitting and/or receiving data via one or more communication protocols to and/or from a print device that is attached to or is integral with the status indicator feedback unit 100.

In an embodiment, the status indicator feedback unit 100 may also include a user interface 106 to transmit to and/or receive instructions from a user of the print device. Example may include, without limitation, a keypad, a touchscreen, an audio interface, or the like. In some embodiments, the status indicator feedback unit 100 may also include a display 103 and a sound module 108 for providing device status information to a user, in addition to the LED feedback mechanism. In an embodiment, the audio module 108 may include, without limitation, a sound card, a sound chip, and other sound output circuitry that may outputs audio to a speaker, headphones, or the like (not shown).

Figure 1B:
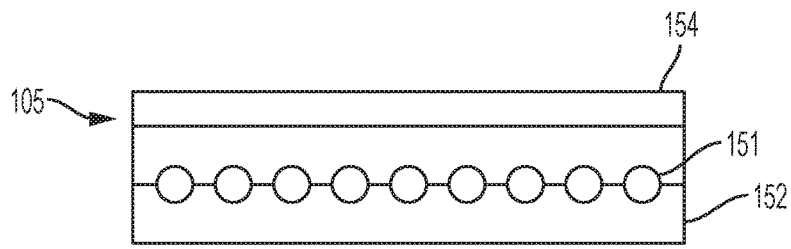
FIG. 1B illustrates an example diagram of a light emitting module, according to one embodiment.

In an embodiment, the status indicator feedback unit 100 may include one or more light emitting modules 105. As shown in FIG. 1B, a light emitting module 105 may include one or more light emission devices 151 (e.g., a light-emitting diode (LED), a light pipe, or the like) mounted on a substrate 152. The substrate 152 is a mounting substrate, and provides electrical conductors (not shown) and electrical circuits such as a printed circuit board (not shown) for electrically connecting the LEDs 151. The substrate 152 can comprise silicon, or another semiconductor material such as GaAs, SiC, GaP, GaN or AlN. Alternately, the substrate 152 can comprise a ceramic material, sapphire, glass, a printed circuit board (PCB) material, a silicone submount substrate, or any packaging substrate used in the art.

In an embodiment, the light emitting module 105 may include a light emitting display 154 that provides a visual status indicator feedback with respect to a print device. In an embodiment, the light emitting display 154 may include one or more optical components for diffusing light from the one or more LEDs. For example, an optical component may include a lens structure made from a suitable material such as, without limitation, silicone, glass, clear resin, epoxy, or the like. In an embodiment, the lens structure may include a design configured to emit light according to a desired pattern (such as intensity, color, etc.). In an embodiment, the optical components may be configured (or designed) to project light in any desired pattern, angle, or direction for creating a dynamic feedback pattern (as discussed below).

The one or more LEDs in the light emitting display 154 may be arranged to provide a status indicator feedback in the form of one or more geometrical shapes and/or patterns such as a line bar, a ring, a wave, interconnected shapes, or the like. Additionally and/or alternatively, the light emitting display 154 itself may be of the desired geometrical shape such as a line bar, a ring, a wave, or the like. In an embodiment, the one or more LEDs may include LEDs of different colors or groups of LEDS comprising different colors (such as green, yellow, blue and red, among others) with each group comprising LEDs of the same colors. In an embodiment, the light emitting display 154 may simultaneously display multiple colors. For example, the light emitting display 154 may include a red LED and a green LED may be mounted adjacent to one another behind a lens cover. When the red LED is activated and the green LED is turned off, red light will be emitted. Green light will be emitted when the red LED is off and the green LED is on. Amber light may be produced by simultaneously activating both the green and red LEDs.

Additionally and/or alternatively, the light emitting module 105 may be configured to display multiple colors to convey particular information to a user (as discussed below).

The light emitting module 105 may also include other components such as a heat sink, a power supply, or the like (not shown here).

The light emitting module 105 may include a control unit (not shown) in communication with the processor 101, for generating various control signals that affect the emission of light through the one or more LEDs. The processor 101 may send and/or receive control signal to and/or from the control unit via one or more protocols (such as I²C, PWM, analog, digital, or the like).

In one embodiment, the LED control unit may adjust the brightness, color, pattern, timing, and on/off of the one or more LEDs to display the machine state, and its corresponding status, of a print device. In an embodiment, the LED control unit may include ports connecting to one or more LEDs. The LED control unit may change the duty cycle of pulse width modulation (PWM) to adjust the brightness and on/off of each LED in the light emitting module 105. In PWM, a high-frequency signal (e.g., a square wave signal at 100 kHz) has its pulse width adjusted up or down to control the amount of power being drawn by an LED. The duty cycle is a ratio between the pulse width and the pulse period, and is represented as a percentage. Duty cycle of a PWM signal determines the average LED current flow. As the duty cycle is increased, the pulse width becomes wider while the period remains the same and an LED gets brighter. Additionally and/or optionally, the LED control unit may regulate the amount of current supplied to each of the LEDs where the intensity of the light emitted by an LED on the amount of current supplied to the LED. In an embodiment, the control unit may also adjust the color of a status indicator feedback by turning on/off LEDs of one or more colors. Other now or hereafter known regulation methods are within the scope of this disclosure.

In one embodiment, the status indicator feedback unit 100 may include one or more sensors 107 such as a proximity sensor, a biometric sensor, a radio frequency identification (RFID) tag for authenticating a user, or the like. In an embodiment, status indicator feedback unit 100 may only provide a status indicator feedback in response to a sensor detecting a user in the vicinity of a print device.

In an embodiment, the status indicator feedback unit 100 also includes a computer-readable medium containing programming instructions that, when executed, cause the processor 101, and/or other processing devices to: (i) receive information relating to a machine state and its corresponding status of a print device from one or more sensors; (ii) analyze the received information to determine a machine state and its corresponding status of the print device; and/or (ii) provide device status information to a user using an light indicator feedback mechanism. The computer-readable medium may be a memory unit 102 of the status indicator feedback unit 100, a memory unit of a print device (not shown here), a memory unit of the light emitting module, or a memory of another device such as a remote system that is in communication with the print device and/or the status indicator feedback unit 100.

In an embodiment, to receive a machine state and other status information of a print device, the status indicator feedback unit 100 may also include an attachment interface 109 configured to attach to a corresponding counterpart of the print device, an MFD, or the like. The attachment interface may allow the status indicator feedback unit 100 to electronically and/or physically connect to a print device for sending and/or receiving information to and/or from the attached print device. An attachment interface 109 may include, without limitation, a wired connection (such as a cable), one or more connection ports (such as a data port), a docking station, or the like. Alternatively and/or additionally, the status indicator feedback unit 100 may communicate with the print device using wireless communications protocols such as Bluetooth, Wi-Fi, Zigbee, or the like.

Figure 2:
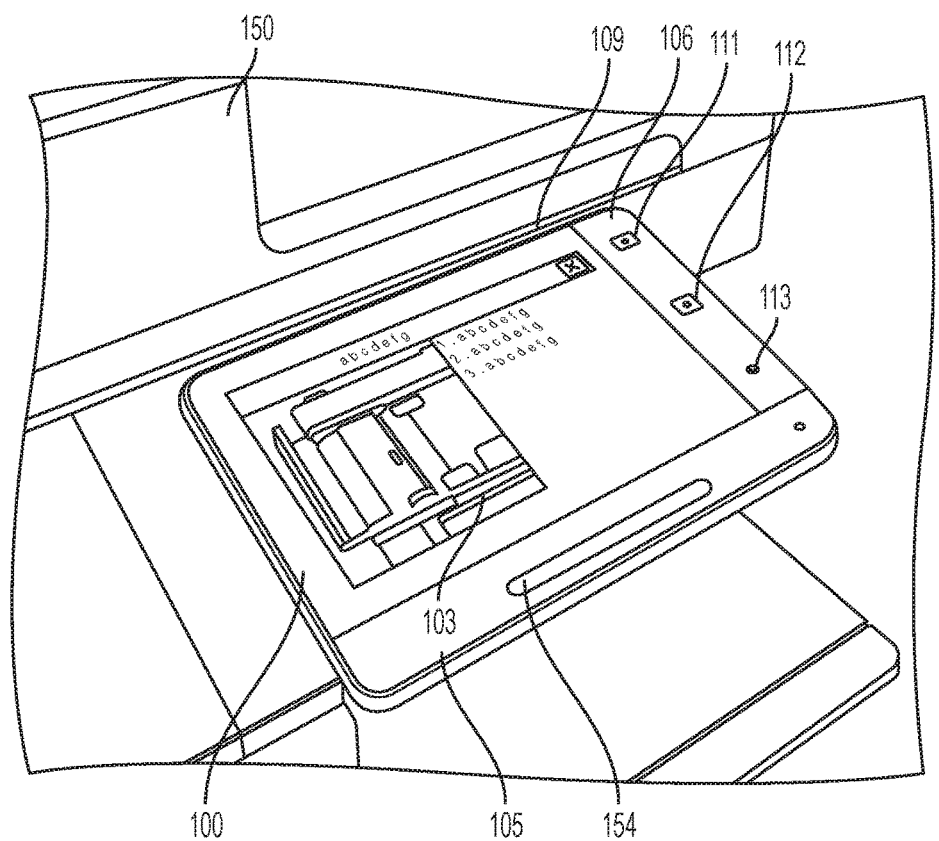
FIG. 2 illustrates an example system for conveying device status information using a light indicator feedback mechanism, according to an embodiment.
Figure 9:
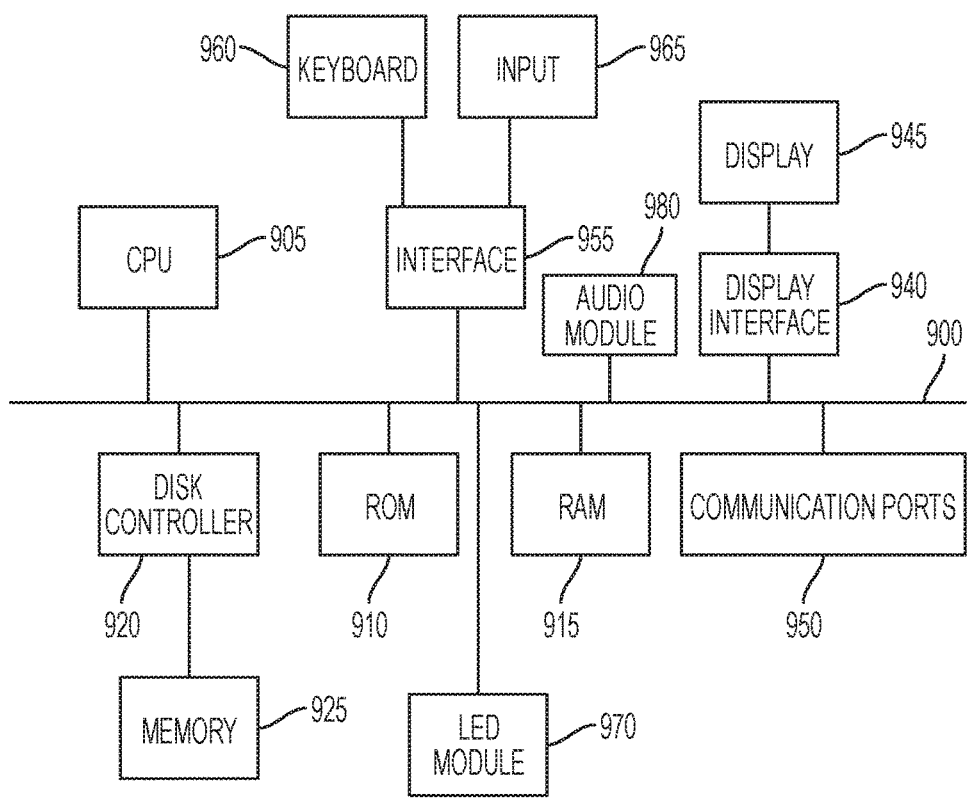
FIG. 9 depicts various embodiments of one or more electronic devices for implementing the various methods and processes described herein.

FIG. 2 shows an example system for conveying device status information using a light indicator feedback mechanism with a status indicator feedback unit 100 proximate to a print device 150. As used herein "proximate" refers to, without limitation, attached to the print device, or in the vicinity of the print device such that the status indicator feedback unit may communicate with the print device. In an embodiment, status indicator feedback unit 100 attached to a print device 150, via an attachment interface 109. In another embodiment, the status indicator feedback unit 100 may be disposed near the print device 150 and may communicate with the print device 150 via a wired or wireless communications link (such as Bluetooth, Internet, or the like). Example internal configuration of an example system is shown in FIG. 9 below.

As shown in FIG. 2, the status indicator feedback unit 100 may include a light emitting module 105, which includes a light emitting display 154. The status indicator feedback unit of FIG. 2 also includes a display 103 for providing more information to a user, in addition to the indicator light feedback mechanism. For example, in an embodiment, the display 103 may provide detailed information about a dynamic feedback pattern emitted by the LED module and/or an audio module using text, graphics, and/or pictures. As shown in FIG. 2, the status indicator feedback unit 100 may also include one or more user interfaces 106 (a button, a touch screen, or the like), which includes, for example, a "home button" 111, a "power" button 112, an audio control 113, etc.

Figure 3:
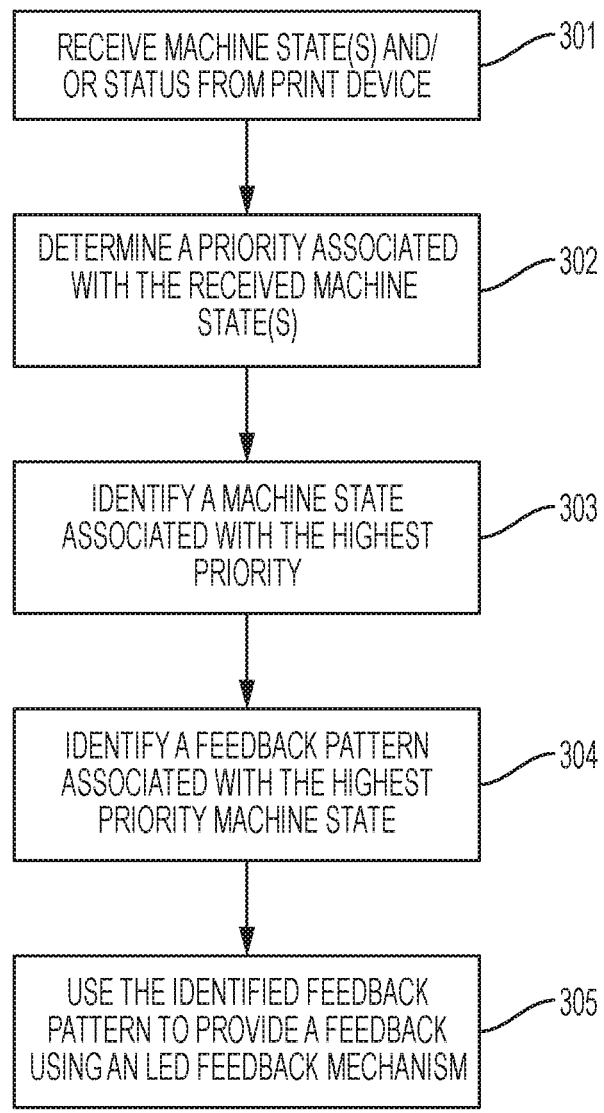
FIG. 3 is a flowchart that illustrates an example method for conveying device status information using a light indicator feedback mechanism, according to one embodiment.

A method for conveying device status information using a light indicator feedback mechanism is further described in detail, with reference to FIG. 3. The status indicator feedback unit may receive 301 one or more current machine states, and their corresponding statuses, for a print device. In an embodiment, one or more sensors of a print device may continuously transmit data relating one or more electronic components of the print device to a processor of the print device, which may use the data to determine a current machine state, and its corresponding status, before transmitting it to the status indicator feedback unit. In an alternate embodiment, the status indicator feedback unit may receive information relating to one or more current machine states and their corresponding statuses (such as data relating one or more electronic components of the print device from the one or more sensors and/or a processor of the print device) of a print device, and process the received information to determine the current machine state, and its corresponding status, of the print device.

Alternatively and/or additionally, the status indicator feedback unit may receive information relating to current machine state(s), and its corresponding status, of an attached print device at fixed time intervals, upon user request, and/or upon occurrence of certain events. Examples of such events may include, without limitation, change in a machine state of a print device, change in a status of the machine state of a print device, resolving of a fault or error of a print device, detection of a user in proximity of a print device (using a proximity sensor), or the like. The information may include, without limitation, the current machine state such as on, off, idle, powering on, powering off, printing, authenticating user, receiving data, printing, various faults such as low toner, no paper, or the like and corresponding status information for the machine states.

In an embodiment, the status indicator feedback unit may determine 302 a priority associated with the received machine state(s). As discussed above, examples of machine state may include, SHUTDOWN ERROR STATE, NEEDS ATTENTION STATE, OPERATIONAL STATE, STEADY STATE, or the like, and status provides additional information about a particular machine state.

In an embodiment, machine states that require immediate user intervention because it has caused the system to be unable to produce the intended output or perform the intended function are "shutdown error" states. Examples may include, without limitation, a mis-feed jam (when an original an original has not been successfully fed through a document feeder), a paper jam, out of toner that is required for a current job, out of staples that is required for a current job, out of paper in a tray that is feeding a current job, print device cannot download data, or the like. In an embodiment, the shutdown error states may be assigned a high priority.

In an embodiment, machine states that indicate that a fault has occurred with respect to a print device resource(s), but based on the system state and job request, the resource(s) is not immediately required are "needs attention" states. Examples may include, without limitation, out of toner that is not required for a current job, out of staples that is not required for a current job, out of paper in a tray that is not feeding a current job, low paper for a current job, low staples for a current job print device cannot download data for a future job, firmware updates, or the like. In an embodiment, the needs attention states may be assigned an intermediate priority.

In an embodiment, machine states that indicate a current ongoing function of a print device are called "operational" states. Examples may include, printing, faxing, powering on, powering off, transitioning to (or recovering from) power saving mode, authenticating a user, processing a print job, or the like. In an embodiment, the operational states may be assigned a low priority.

In an embodiment, machine states that indicate a normal/ready state of a print device (i.e., when not performing a function) are called "steady" states. Examples may include, on, off, idle, function (like printing, etc.) completed, or the like. In an embodiment, the operational states may be assigned a lowest priority.

A status comprising more information about a machine state may be associated with one or all of the machine states discussed above. For example, status of a machine state may include an indication of the type of machine state (such as shutdown error, needs immediate attention, operational, or steady state), an identification of the particular machine state (such as no paper, no toner, printing, powering on, etc.), and other information such as identification of a paper tray with no paper, identification of a toner, progress of printing, or the like.

The above discussed machine states, examples, corresponding priority levels, and status, are provided by way of example only and other states and priority rules are within the scope of this disclosure.

In an embodiment, the status indicator feedback unit may identify 303 the machine state(s) associated with the highest priority from amongst the current machine states received from the print device. For example, if the current machine states received from the print device include two machine states: paper required for an upcoming print job (needs attention state) and printing a print job (an operational state), the status indicator feedback unit will identify the paper required for an upcoming print job, as the highest priority machine state. In the above example, if the current machine states also include a shutdown error state such as staples required for the current print job, the status indicator feedback unit will identify it as the highest priority machine state.

In an embodiment, the status indicator feedback unit may identify more than one machine state as the highest priority machine state. For example, in an embodiment, one or more machine states may be in the same category such as the shutdown error state, the needs attention state, the operational state, or the steady state. For example, the current machine states received from the print device may include out of toner and out of paper for the current print job, both of which are shutdown error states, and the status indicator feedback unit may identify both the machine states associated with the highest priority.

Alternatively and/or additionally, a rule set may define priority rankings for various machine states in each of the above categories. For example, a paper jam may be given highest priority in the shutdown error state; a powering on machine state may be given highest priority in the operational machine state; or the like. Other rules are within the scope of this disclosure.

In another embodiment, the status indicator feedback unit may use information received about the current machine states (i.e., the status) to identify the highest priority machine states. For example, in an embodiment, if more than one received machine state is identified as the highest priority based on the category, the status indicator feedback unit may use a rule set that uses the status information to identify a single machine state as the highest priority. For example, in the needs attention machine states if the toner is running low for the next print job in a print queue and paper is running low for the third print job in the print queue, the status indicator feedback unit may identify the toner running low machine state as having the highest priority. In another example, in the operational machine state, if the status indicator feedback unit may identify the highest priority machine state based on the percentage of completion of an operation (such as machine state having a higher percentage of completion may have a higher priority or vice versa). In yet another example, priority may be decided based upon a priority associated with a user who submitted the affected print job. Other rules are within the scope of this disclosure.

Alternatively and/or additionally, in an embodiment, the status indicator feedback unit may identify a highest priority machine state in one or more of the above defined categories. For example, if the status indicator feedback unit receives one or more current machine states in more than one category, it may identify a highest priority machine state in each of the categories.

Once the status indicator feedback unit has identified the machine state(s) associated with the highest priority from amongst the current machine states received from the print device, in an embodiment, it may identify 304 a dynamic feedback pattern associated with the identified machine state(s). A dynamic feedback pattern refers to a sensory output (e.g., dynamic display effect, audio-visual effect, or the like) in a particular sequence or arrangement that provides, to a user, relevant information about one or more machine states of a print device. One or more characteristics of the dynamic feedback pattern also changes in real-time to provide information about a status(es) of the one or more machine states. A dynamic feedback pattern may include visual patterns formed using, without limitation, visual color patterns, light intensity variations, illumination patterns, illumination shapes, illumination sizes, and/or a combination thereof. In an embodiment, the dynamic feedback pattern may also include an audio pattern. In an embodiment, the dynamic feedback pattern is automatically updated in real-time if machine state and/or a priority associated with the machine state changes.

In an embodiment, a dynamic feedback pattern may convey information to the user based on visual patterns formed using one or more colors of light such as monochromatic lights or lights that can be adjusted to produce two, three, or more than three colors. For example, a red color may be used to indicate machine states in the shutdown error state category, an amber color may be used to indicate machine states in the needs attention state category, a green color may be used to indicate machine states in the operational state category, and a blue color may be used to indicate machine states in the steady state category. One or more colors may also be used to distinguish between machine states in the same category. In some embodiments, more than one color in a dynamic feedback pattern may be used to convey information about one or more machine states.

In another example of a dynamic feedback pattern, a visual pattern may be formed by varying the intensity of light (e.g., from a low level to a high level, breathing, etc.). For example, a dynamic feedback pattern may include increasing the intensity of light and/or frequency of breathing based on the increase (or decrease) in time a print device is in a machine state in the shutdown error state and/or a needs attention state. In another example, a dynamic feedback pattern may include increasing (or decreasing) the intensity of light and/or frequency of breathing as the time for processing a job associated with a machine state in the needs attention state category approaches. In yet another example, a dynamic feedback pattern may include decreasing (or increasing) the intensity of light and/or frequency of breathing based on the increase in time a print device is in a machine state corresponding to a steady state category. In another example, a dynamic feedback pattern may include increasing the intensity of light and/or frequency of breathing based on the increase (or decrease) in percentage of completion of an operation in a machine state corresponding to the operational state category.

A dynamic feedback pattern may also convey information based on visual patterns formed using different illumination patterns (solid or steady, blinking, blinking with different patterns and/or rates, increasing/decreasing in size, etc.). For example, a solid light may be used to convey information about a machine state in the steady state and/or operational category and/or a blinking light may be used to convey information about a machine state in the shutdown error state and/or the needs attention state category. In an embodiment, a dynamic feedback pattern may include increasing the rate of blinking of light based on the increase (or decrease) in time a print device is in a machine state in the shutdown error state and/or a needs attention state. In another example, a dynamic feedback pattern may include increasing (or decreasing) the rate of blinking as the time for processing a job associated with a machine state in the needs attention state category approaches. In yet another example, a dynamic feedback pattern may include increasing/decreasing the size of a solid light based on the increase (or decrease) in percentage of completion of an operation in a machine state corresponding to the operational state category.

In yet another example, a dynamic feedback pattern may include visual patterns formed using illumination patterns that create different shapes (for e.g., by selective illumination of LEDs) such as a bar shape, a ring shape, a circle, and/or a combination thereof. Different shapes may be associated with different machine states.

In an embodiment, a dynamic feedback pattern may also include an audio pattern. For example, a speaker may be used to provide a beeping tone or other audible output that conveys machine state information. In some embodiments, the audio output may simulate a visual effect corresponding to the machine state and its corresponding status. Audible and visible status indicator feedbacks may be combined (e.g., by providing a status indicator feedback tone in conjunction with a flashing light output). For example, the relative intensity, rate of change in the intensity, color, etc. of the light emitted by the light emitting module can be similar to the amplitude, volume, and/or frequency of the audio output from the audio module.

In an embodiment, a dynamic feedback pattern may also include using a display to provide more information about a machine state and its corresponding status in text, graphical, and/or picture form. Examples of information may include, instructions for a user to rectify error states, current settings, identification of one or more machine states, or the like.

In an embodiment, one or more of the above visual patterns such as color patterns, intensity variations, illumination patterns, illumination shapes, and illumination sizes, and/or audio patterns may be combined in a dynamic feedback pattern to convey information about a machine state(s), and its corresponding status, of a print device. For example, a red color may be used to indicate a machine state corresponding to a shutdown error state and its corresponding status (such as time) may be indicated using a blinking pattern with change in rate of blinking. Similarly, a green color may be used to indicate a machine state corresponding to an operational state, and growing ring and/or bar shape may be used to indicate corresponding status (such as percentage of completion). In one example, a currently printing machine state may be shown using a rectangle and different segments of the rectangular may be illuminated sequentially in a green color from a first end to a second end of the indicator to create a sweeping pulse of color to indicate the percentage of completion. The distance over which the rectangular indicator is illuminated can indicate the completion status of the print job.

Various other examples for dynamic feedback patterns and their corresponding printer status indications, according to an embodiment, are provided below in Table 1:

TABLE 1

| Machine State | Feedback Pattern | | |
|---|---|---|---|
| and Definition | Color 1 | Color 2 | Color 3 |
| Powering ON -- The process of powering up. Power ON (Standby) - The device is powered on and in the "Ready" state. | | | High Rate Breathing Solid Blue pattern (High rate breathing sequenced to solid color) |
| User detection in proximity of print device Authentication request recognition - The device has recognized an authentication request | | | Low Rate Breathing Solid blue pattern (for duration of an audio alert) |

TABLE 1-continued

| Machine State and Definition | Color 1 | Color 2 | Color 3 |
|---|---|---|---|
| Authentication completion - The device has successfully recognized and performed the authentication action | | | Solid to Breathing Off |
| Authentication cancel - The device has recognized that the authentication action has been cancelled | | | Solid to Breathing Off |
| Document misfeed or Mis-feed jam | | High Rate Breathing | |
| Printed Document delivered - The device provides feedback of successful delivery of printed output to the Center Output | Solid bar upon completion of printing; (Growing bar for duration of printing showing progress) | | |
| NFC mobile tap to pair request feedback ---The device recognizes the users 'tap to pair' request from an NFC tag. | | | High Rate Breathing x 2 |
| Completion of fax print - The device has confirmed that a fax job has been printed. | Low Rate Breathing x2 | | Low Rate Breathing x2 |
| System error and others - (LED blinking case of error alarm) - The device has detected that a system error has occurred (serious device shutdown such as paper jam) | | Blinking | |
| Error alarm The device has detected that a shutdown error state fault has occurred. For example, indicating that the paper tray that is currently feeding paper, is out of paper resulting in a shutdown. | | High Rate Breathing | |
| Error resolved - The device has detected that an error which had caused a shutdown, has been corrected. | | Immediate off | |
| Need Attention state - such as the device has detected low toner. | | Solid light | |

It should be noted that the above dynamic feedback patterns and examples are provided by way of example only and various other patterns may be used without deviating from the principles of this disclosure. Similarly, the dynamic feedback pattern examples may be used to convey information about other machine states. In an embodiment, a user may provide some or all of rules for identifying and/or creating the dynamic feedback patterns and the associated machine state.

In an embodiment, the status indicator feedback unit may use the above identified dynamic feedback pattern to provide 305 a dynamic status indicator feedback about the machine state of a print device, by emitting the visual pattern (associated with the dynamic feedback pattern) using a light feedback mechanism. As discussed above, the status indicator feedback unit may include an LED control unit that may use the visual patterns associated with the identified dynamic feedback pattern to adjust the brightness, color, pattern, timing, and on/off of the one or more LEDs to provide a dynamic status indicator feedback to a user using an light indicator feedback mechanism. As is known to those skilled in the art, luminance of the LED is a function of the average current flow through the LED. In an embodiment, the LED control unit may use one or more of any now or hereafter known protocols (such as PWM, $I^2C$, etc.) to create the dynamic feedback pattern (discussed above). For example, in an embodiment, the control unit may generate illumination signals to the one or more LEDs, such that the illumination signals depend upon the dynamic feedback pattern. For example, an illumination signal delivered to an LED may include information relating to drive current, voltage, color, frequency, intensity, etc. for illumination of that particular LED.

In an embodiment, the status indicator feedback unit may use the above identified dynamic feedback pattern to provide dynamic status indicator feedback about the machine state of a print device, by outputting the audio pattern (associated with the dynamic feedback pattern) using an audio module.

In an embodiment, the system may dynamically update and/or adjust the dynamic feedback pattern for providing the dynamic status indicator feedback, based upon information received from one or more sensors of the print device. For example, during a powering on sequence, the system may continuously receive information about the power status of one or more components of the print device and use the information to determine a percentage of completion of the powering on sequence and/or time remaining till completion. The system may then update and/or adjust the dynamic feedback pattern for providing the dynamic status indicator feedback such that the indicator indicates percentage of completion of the powering on sequence and/or time remaining till completion in real time. In another example, the system may receive information from sensors such as the toner sensor, paper sensor, etc. to continuously determine if a change in a machine state, and its corresponding status, corresponding to the sensor (such as toner cartridge replaced, paper added, toner running low for next print job, or the like). The system may then update and/or adjust the dynamic feedback pattern for providing the dynamic status indicator feedback such that the indicator indicates the machine state, and its corresponding status, in real time.

Figure 4:
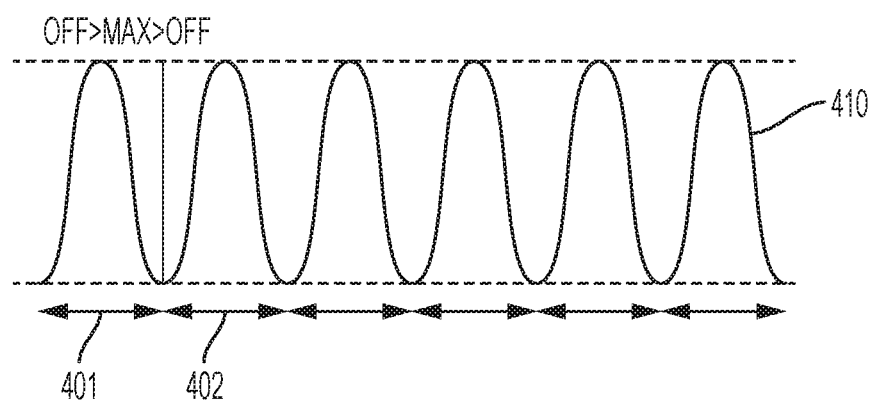
FIG. 4 illustrates an intensity versus time graph for a high rate breathing illumination pattern, according to an embodiment.
Figure 5:
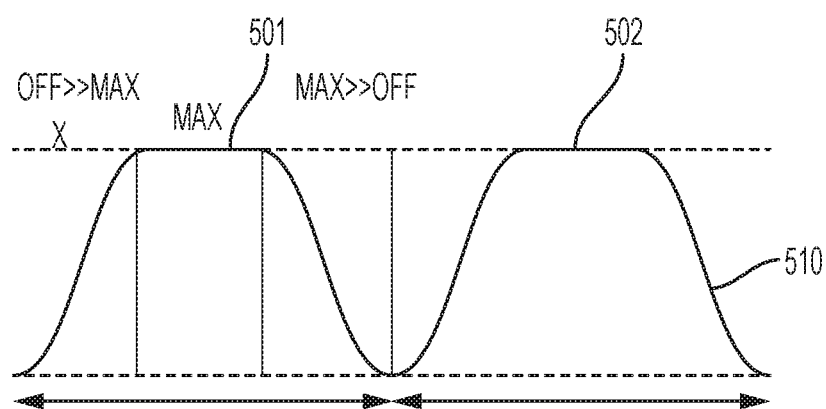
FIG. 5 illustrates an intensity versus time graph for a low rate breathing illumination pattern, according to an embodiment.
Figure 6:
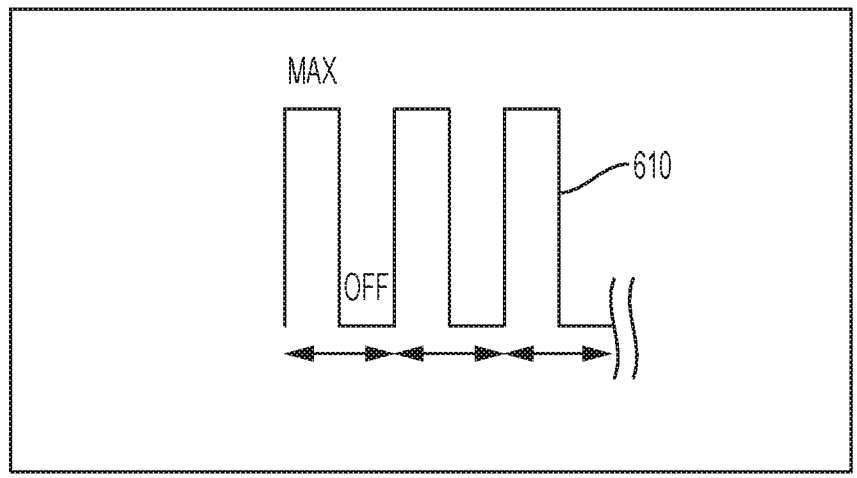
FIG. 6 illustrates an intensity versus time graph for a blinking illumination pattern, according to an embodiment.
Figure 7:
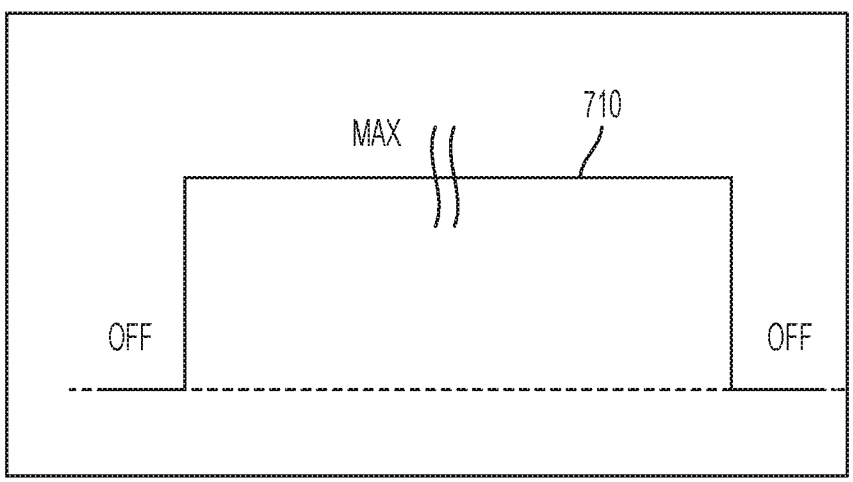
FIG. 7 illustrates an intensity versus time graph for a solid (steady) illumination pattern, according to an embodiment.
Figure 8:
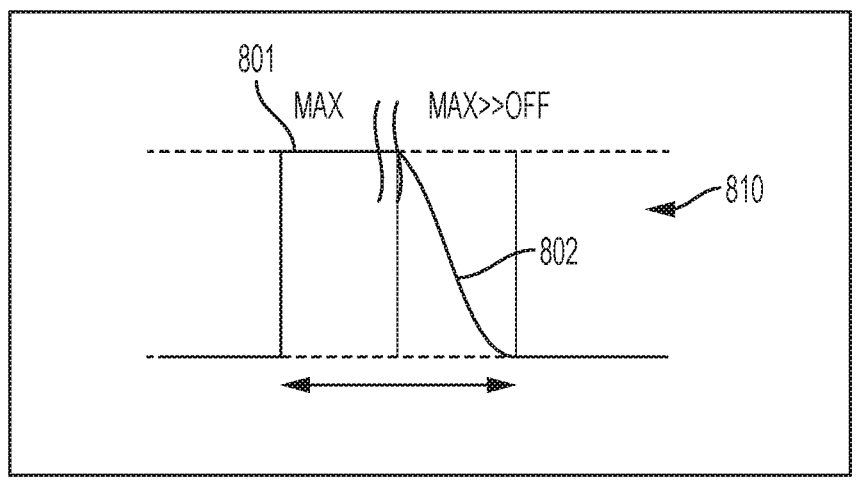
FIG. 8 illustrates an intensity versus time graph for a dynamic feedback illumination pattern, according to an embodiment.

FIGS. 4-8 illustrate example intensity (y-axis) versus time (x-axis) graphs for feedback light patterns. As shown in FIG. 4, curve 410 shows intensity versus time graph for a high rate breathing pattern. In an embodiment, a high rate breathing pattern may have a waveform shaped curve (410) with a desired frequency such that the intensity of light changes gradually from "off" to "maximum," and then gradually "off" again in a desired time period (section 401, 402, and so on). Off may correspond to zero intensity. Maximum may correspond to any non-zero intensity of light and a pattern may include one or more different maximum values. Examples of the time period may be 1 second, 1.5 seconds, 2 seconds, 5 seconds, 10 seconds, or the like. Sections 401, 402, etc. may or may not have the same amplitude and/or frequency. Curve 510 in FIG. 5 shows intensity versus time graph for a low rate breathing pattern. A low rate breathing pattern is different from a high rate breathing pattern in that the intensity of light stays at "maximum" for a perceptible amount of time (501, 502). Hence, in a high rate breathing pattern the intensity of light changes gradually from "off" to "maximum," stays "maximum" for some time, and then changes gradually from "maximum" to "off." Curve 610 in FIG. 6 shows intensity versus time graph for a blinking pattern. A blinking pattern is different from a breathing pattern in that, as shown in FIG. 6, the intensity is instantaneously (or almost instantaneously) changes from "off" to "maximum," or vice versa in a desired time period. Examples of the time period may be 1 second, 1.5 seconds, 2 seconds, 5 seconds, 10 second, or the like. FIG. 7 shows intensity versus time graph for a solid color pattern (710), and the light intensity stays steady at "maximum" (i.e., a non-zero intensity). Finally, FIG. 8 shows an intensity versus time graph (810) for a dynamic feedback pattern that includes a change in intensity from steady solid at a non-zero intensity (801) to a gradual breathing "off" (802).

FIG. 9 depicts an example of internal hardware that may be included in any of the electronic components of the system, the status indicator feedback unit, the print device, or another device in the system. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors Read only memory (ROM) 910 and random access memory (RAM) 915 constitute examples of memory devices or processor-readable storage media.

A controller 920 interfaces with one or more optional tangible, computer-readable memory devices 925 to the system bus 900. These memory devices 925 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 910 and/or the RAM 915. Optionally, the program instructions may be stored on a tangible computer readable medium 925 such as a compact disk, a digital disk, flash memory, a memory card, a USB drive, an optical disc storage medium, such as a Blu-Ray™ disc, and/or other recording medium controlled via a disk controller 920.

An optional display interface 940 may permit information from the bus 900 to be displayed on a display device 945 in visual, graphic or alphanumeric format. An Light emitting module 970 may include one or more LEDs and associated circuitry for generating various light effects by affecting the emission of light through the LED. An audio interface and audio output (such as a speaker) also may be provided. An audio interface and audio output (such as a speaker) also may be provided. An audio module 980 may include a sound card, a sound chip, and other sound output circuitry that outputs audio to a speaker, headphones, or the like.

Communication with external devices such, as a printing device, may occur using various communication devices 950 such as a transmitter and/or receiver, antenna, an RFID tag and/or short-range or near-field communication circuitry. A communication device 950 may be attached to a communications network, such as the Internet, a local area network or a cellular telephone data network.

The hardware may also include a user interface 955 that allows for receipt of data from input devices 960 such as a keyboard, a mouse, a joystick, a touchscreen, a remote control, a pointing device, a video input device (camera) and/or an audio input device (microphone). Various sensors (not shown here) such as a proximity sensor, may be included to detect user proximity. Other example sensors that may be used to detect user proximity may include, without limitation, a biometric sensor, an embedded sensor, user authentication modules such as a mag strip, a chip, an RFID tag, or the like.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A system for providing print device dynamic status indicator feedback to a user, comprising:
   a print device comprising a print engine and one or more status monitors; and
   a status indicator feedback unit, wherein the status indicator feedback unit comprises:
     a display device,
     a light emitting module proximate to the display device,
     a processor in communication with the light emitting module, and
     a computer-readable medium containing programming instructions that are configured to, when executed by the processor, cause the processor to:
       receive information corresponding to one or more current machine states of the print device from the one or more status monitors of the print device,
       determine a priority level associated with each of the one or more current machine states,
       identify a machine state associated with a highest priority level from amongst the one or more current machine states,
       identify a dynamic feedback pattern associated with the identified machine state, wherein the dynamic feedback pattern comprises a visual pattern for providing a dynamic status indicator feedback, and wherein:
         a characteristic of the visual pattern continuously and dynamically changes over time to convey real-time information about a status of the identified machine state, and
         the characteristic is selected from the following: a size of the visual pattern, a shape of the visual pattern, an intensity of the visual pattern, or a brightness of the visual pattern, and
       instruct the light emitting module to emit the visual pattern.

2. The system of claim 1, wherein the light emitting module comprises:
   a light emitting display comprising an LED; and
   a control unit, wherein the control unit is configured to:
     receive the dynamic feedback pattern associated with the identified machine state from the processor, and
     generate commands to cause the LED to emit the visual pattern and provide the dynamic status indicator feedback.

3. The system of claim 1, wherein:
   the system further comprises an audio module; and
   the computer-readable medium comprises additional programming instructions that are configured to, when executed by the processor, cause the processor to:
     identify the dynamic feedback pattern so that the dynamic feedback pattern also comprises at least one audio pattern, and
     instruct the audio module to output the audio pattern as the light emitting module emits the visual pattern.

4. The system of claim 3, wherein the instructions that cause the audio module to output the audio pattern are configured to cause the audio pattern to simulate the visual pattern.

5. The system of claim 1, wherein the programming instructions that are configured to cause the processor to receive the information corresponding to the one or more current machine states from the print device comprise programing instructions that are configured to cause the processor to receive the information:
continuously;
at fixed time intervals;
in response to a change in a machine state of the print device; or
in response to a request sent from the status indicator feedback unit to the print device.

6. The system of claim 1, wherein the programming instructions that are configured to cause the processor to determine the priority level associated with each of the one or more current machine states comprise programing instructions that are configured to cause the processor to:
identify a category associated with each of the one or more current machine states, wherein the category is selected from: a shutdown error state, a needs attention state, and operational state, and a steady state; and
assign the priority level based on the identified category, wherein a machine state in the shutdown error state category is assigned a highest priority level, a machine state in the needs attention state category is assigned an intermediate priority level, a machine state in the operational state category is assigned a low priority level, and a machine state in the steady state category is assigned a lowest priority level.

7. The system of claim 6, wherein the dynamic feedback pattern comprises one or more distinct visual patterns corresponding to: a machine state in the shutdown error state category, a machine state in the needs attention state category, a machine state in the operational state category, or a machine state in the steady state category.

8. The system of claim 1, wherein the programming instructions that are configured to cause the processor to identify the machine state associated with the highest priority level comprise programing instructions that are configured to cause the processor to identify the machine state associated with the highest priority level based on one or more of the following:
the assigned priority level; or
a status of the one or more current machine states, wherein the status comprises information about the one or more current machine states.

9. The system of claim 1, wherein the visual pattern comprises patterns formed using one or more of the following: one or more LED colors, one or more LED intensity variations, one or more LED illumination patterns, one or more LED illumination shapes, or one or more LED illumination sizes.

10. The system of claim 1, wherein the display device is configured to provide information about the dynamic status indicator feedback using one or more of the following: text, graphics, or pictures.

11. The system of claim 1, the visual pattern comprises one or more of the following:
a low-rate breathing illumination pattern;
a high-rate breathing illumination pattern;
a blinking illumination pattern;
a solid illumination pattern;
a growing bar shape illumination pattern; or
a growing ring shape illumination pattern.

12. The system of claim 6, wherein:
the identified machine state is in the shutdown error state category; and
the visual pattern includes a high-rate breathing illumination pattern in a red color.

13. The system of claim 6, wherein:
the identified machine state is in the needs attention state category; and
the visual pattern includes a low-rate breathing illumination pattern, wherein a rate of breathing of the low rate breathing-pattern increases or decreases to indicate a status of the identified machine state.

14. The system of claim 6, wherein:
the identified machine state is in the operational state category; and
the visual pattern includes a growing bar shape illumination pattern, wherein a size of the growing bar shape illumination pattern increases or decreases to indicate a status of the identified machine state.

15. The system of claim 14, wherein the status of the identified machine state provides information relating to a time to completion associated with the identified machine state in the operational state category.

16. A multifunction device comprising:
a print engine; and
a status indicator feedback unit, wherein the status indicator feedback unit comprises:
a light emitting module,
a processor in communication with the light emitting module, and
a computer-readable medium containing programming instructions that are configured to, when executed by the processor, cause the processor to:
receive information corresponding to one or more current machine states of the multifunction device from one or more status monitors,
determine a priority level associated with each of the one or more current machine states,
identify a machine state associated with a highest priority level from amongst the one or more current machine states,
identify a dynamic feedback pattern associated with the identified machine state, wherein the dynamic feedback pattern comprises a visual pattern for providing a dynamic status indicator feedback, wherein:
a characteristic of the visual pattern continuously and dynamically changes over time to convey real-time information about a status of the identified machine state, and
the characteristic is selected from the following: a size of the visual pattern, a shape of the visual pattern, an intensity of the visual pattern, or a brightness of the visual pattern, and
instruct the light emitting module to emit the visual pattern.

17. A method for providing print device dynamic status indicator feedback to a user, comprising:
receiving, by a processing device, information corresponding to one or more current machine states of a print device from one or more status monitors of the print device;
determining, by the processing device, a priority level associated with each of the one or more current machine states;

identifying, by the processing device, a machine state associated with a highest priority level from amongst the one or more current machine states;

identifying, by the processing device, a dynamic feedback pattern associated with the identified machine state, wherein the dynamic feedback pattern comprises a visual pattern for providing a dynamic status indicator feedback, and wherein:
- a characteristic of the visual pattern continuously and dynamically changes over time to convey real-time information about a status of the identified machine state, and
- the characteristic is selected from the following: a size of the visual pattern, a shape of the visual pattern, an intensity of the visual pattern, or a brightness of the visual pattern; and instructing, by the processing device, a light emitting module to emit the visual pattern.

18. The method of claim 17, wherein:
the light emitting module comprises a control unit; and
instructing, by the processing device, the light emitting module to emit the visual pattern comprises, by the control unit:
- receiving the dynamic feedback pattern associated with the identified machine state, and
- generating commands to cause an LED of the light emitting module to emit the visual pattern.

19. The method of claim 17, further comprising
identifying the dynamic feedback pattern so that the dynamic feedback pattern also comprises at least one audio pattern; and
instructing, by the processing device, an audio module to output the audio pattern as the light emitting module emits the visual pattern.

20. The method of claim 19, wherein instructing the audio module to output the audio pattern comprises causing the audio module to output the audio pattern to simulate the visual pattern.

21. The method of claim 17, wherein receiving, by the processing device, the information corresponding to the one or more current machine states from the print device comprises receiving the information:
continuously;
at fixed time intervals;
in response to a change in a machine state of the print device; or
in response to a request sent from the status indicator feedback unit to the print device.

22. The method of claim 17, wherein determining, by the processing device, the priority level associated with each of the one or more current machine states comprises:
identifying a category associated with each of the one or more current machine states, wherein the category is selected from: a shutdown error state, a needs attention state, and operational state, and a steady state; and
assigning the priority level based on the identified category, wherein a machine state in the shutdown error state category is assigned a highest priority level, a machine state in the needs attention state category is assigned an intermediate priority level, a machine state in the operational state category is assigned a low priority level, and a machine state in the steady state category is assigned a lowest priority level.

23. The method of claim 22, wherein the dynamic feedback pattern comprises one or more distinct visual patterns corresponding to: a machine state in the shutdown error state category, a machine state in the needs attention state category, a machine state in the operational state category, or a machine state in the steady state category.

24. The method of claim 17, wherein identifying the machine state associated with the highest priority level comprises identifying the machine state associated with the highest priority level based on one or more of the following:
the assigned priority level; or
a status of the one or more current machine states, wherein the status comprises information about the one or more current machine states.

25. The method of claim 17, wherein the visual pattern comprises patterns formed using one or more of the following: one or more LED colors, one or more LED intensity variations, one or more LED illumination patterns, one or more LED illumination shapes, and one or more LED illumination sizes.

26. The method of claim 17, further comprising providing by a display device information about the dynamic status indicator feedback using one or more of the following: text, graphics, or pictures.

27. The method of claim 17, the visual pattern comprises one or more of the following:
a low-rate breathing illumination pattern;
a high-rate breathing illumination pattern;
a blinking illumination pattern;
a solid illumination pattern;
a growing bar shape illumination pattern; and
a growing ring shape illumination pattern.

28. The method of claim 22, wherein:
the identified machine state is in the shutdown error state category; and
the visual pattern includes a high-rate breathing illumination pattern in a red color.

29. The method of claim 22, wherein:
the identified machine state is in the needs attention state category; and
the visual pattern includes a low-rate breathing illumination pattern, wherein a rate of breathing of the low rate breathing-pattern increases or decreases to indicate a status of the identified machine state.

30. The method of claim 22, wherein:
the identified machine state is in the operational state category; and
the visual pattern includes a growing bar shape illumination pattern, wherein a size of the growing bar shape illumination pattern increases or decreases to indicate a status of the identified machine state.

31. The method of claim 30, wherein the status of the identified machine state provides information relating to a time to completion associated with the identified machine state in the operational state category.

* * * * *